United States Patent
Bhagwat et al.

(10) Patent No.: US 9,787,633 B2
(45) Date of Patent: Oct. 10, 2017

(54) SYSTEM AND METHOD FOR DYNAMICALLY CONFIGURING A DHCP SERVER IN A VIRTUAL NETWORK ENVIRONMENT

(71) Applicant: VMWARE, INC., Palo Alto, CA (US)

(72) Inventors: Abhinav Vijay Bhagwat, Pune (IN); Aravind Srinivasan, Pune (IN); Amit Ratnapal Sangodkar, Pune (IN)

(73) Assignee: VMware, Inc., Palo Alto, CA (US)

( * ) Notice: Subject to any disclaimer, the term of this patent is extended or adjusted under 35 U.S.C. 154(b) by 70 days.

(21) Appl. No.: 14/157,547

(22) Filed: Jan. 17, 2014

(65) Prior Publication Data

US 2015/0163196 A1    Jun. 11, 2015

(30) Foreign Application Priority Data

Dec. 5, 2013 (IN) ............................ 5613/CHE/2013

(51) Int. Cl.
H04L 29/12 (2006.01)

(52) U.S. Cl.
CPC ........ *H04L 61/2061* (2013.01); *H04L 61/103* (2013.01); *H04L 61/2015* (2013.01); *H04L 61/255* (2013.01)

(58) Field of Classification Search
CPC ............... H04L 61/103; H04L 61/2007; G06F 9/45558; G06F 9/45533; G06F 9/5077; G06F 2009/45595; G06F 9/455; G06F 2009/4557; G06F 2009/45562; G06F 9/44505
USPC ........................................................... 718/1
See application file for complete search history.

(56) References Cited

U.S. PATENT DOCUMENTS

| | | | |
|---|---|---|---|
| 8,549,187 B1 * | 10/2013 | Christopher | H04L 61/103 709/220 |
| 8,909,780 B1 | 12/2014 | Dickinson et al. | |
| 9,047,109 B1 | 6/2015 | Wang et al. | |
| 2002/0010799 A1 | 1/2002 | Kubota et al. | |
| 2007/0094411 A1 | 4/2007 | Mullane et al. | |
| 2008/0250407 A1 * | 10/2008 | Dadhia | G06F 9/45533 718/1 |
| 2009/0300178 A1 * | 12/2009 | Saunderson | H04L 12/4641 709/224 |
| 2010/0302974 A1 | 12/2010 | Niiyama et al. | |
| 2010/0322087 A1 | 12/2010 | Draznin | |
| 2012/0117241 A1 | 5/2012 | Witt et al. | |

(Continued)

OTHER PUBLICATIONS

Convert mac to IP address dhcp—Google Search—May 25, 2017.*
Sending mac address to dhcp server—Google Search—May 25, 2017.*

*Primary Examiner* — Thomas Dailey
*Assistant Examiner* — Ruth Solomon (57) ABSTRACT

Techniques for dynamically configuring a dynamic host configuration protocol (DHCP) server in a virtual network environment are described. In one example embodiment, DHCP bindings are configured using virtual machine (VM) inventory objects. Further, the configured DHCP bindings are transformed by replacing the VM inventory objects in the configured DHCP bindings with associated media access control (MAC) addresses using a VM object attribute table. Furthermore, the transformed DHCP bindings are sent to the DHCP sever for assigning Internet protocol (IP) addresses to multiple VMs running on a plurality of host computing systems in a computing network.

12 Claims, 4 Drawing Sheets

(56) References Cited

U.S. PATENT DOCUMENTS

| | | |
|---|---|---|
| 2012/0173742 A1 | 7/2012 | Noldus et al. |
| 2012/0297037 A1 | 11/2012 | Kumagai et al. |
| 2013/0019277 A1 | 1/2013 | Chang et al. |
| 2013/0132545 A1 | 5/2013 | Schultze et al. |
| 2013/0311991 A1* | 11/2013 | Li .................. H04L 61/103 718/1 |
| 2014/0130044 A1* | 5/2014 | Zhang ............. G06F 9/45533 718/1 |
| 2015/0052522 A1* | 2/2015 | Chanda ............... G06F 9/455 718/1 |
| 2015/0067143 A1* | 3/2015 | Babakhan ........... G06F 11/301 709/224 |
| 2015/0120911 A1 | 4/2015 | Devnath et al. |

* cited by examiner

SYSTEM AND METHOD FOR DYNAMICALLY CONFIGURING A DHCP SERVER IN A VIRTUAL NETWORK ENVIRONMENT

TECHNICAL FIELD

The present disclosure relates generally to a dynamic host configuration protocol (DHCP) server in a virtual network environment and, more particularly, to dynamically configuring the DHCP server based on any updates made to network services in the virtual network environment.

BACKGROUND

In computer networking, dynamic host configuration protocol (DHCP) is used for dynamically allocating network configuration parameters, such as Internet protocol (IP) addresses, to host computing systems and other IP addressable devices in a network. Generally, a DHCP client sends a configuration request to a DHCP server and the DHCP server sends an IP address to the DHCP client based on the DHCP server's configuration. Information is ordinarily transmitted within networks in packets and the term packet refers to a unit of data communicated within a network. A packet typically includes a packet source identifier and a packet destination identifier used to navigate the packet data through a network. The term packet may refer to a unit of data through a network. The term packet may refer to a unit of data communicated at any level of an open systems interconnection (OSI) model and between levels of the OSI model.

Generally, the DHCP server assigns unique IP addresses to host computing systems using DHCP static bindings, then releases and renews these IP addresses as the host computing systems leave and re-join the network. A security administrator ordinarily configures DHCP static bindings using media access control (MAC) addresses within a file. Similarly, a security administrator can configure the DHCP static bindings using a pool of IP addresses from which a free IP address can be allocated/assigned when a host computing system requests for a configuration.

One challenge with defining the DHCP static bindings in terms of the MAC addresses/pool of IP addresses is the need for the administrator to continually update the DHCP static bindings to keep abreast of changes in a network. Machines may be added or removed from the network requiring corresponding changes to the DHCP static bindings.

Further, in complex networks in which changes are many and frequent, the need to update the DHCP static bindings to keep pace with changes to network configuration, such as user configured DHCP static bindings, virtual machine (VM) inventory objects and the like can pose a significant challenge. This is even more a challenge in a virtual network environment where VMs may be dynamically added and/or removed in which case the DHCP server may need to be manually reconfigured.

DETAILED DESCRIPTION

In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

Embodiments described herein provide enhanced computer-based and network-based methods, techniques, and systems for dynamically configuring a dynamic host configuration protocol (DHCP) server in a virtual network environment. A DHCP manager residing in a management plane maps DHCP bindings including virtual machine (VM) inventory objects to associated media access control (MAC) addresses and dynamically configures the DHCP server located in a data plane based on the mapping information. Basically, the technique involves formulating the DHCP bindings using VM identifiers and machine attributes, such as MAC addresses from a VM object attribute table. Using this technique allows the DHCP server to be dynamically updated anytime VMs are changed or reconfigured.

Further, utility value of configuring the DHCP bindings using the VM inventory objects to an administrator is enhanced by significantly reducing the need for the administrator to manually revisit the DHCP bindings and make corresponding changes to the DHCP bindings whenever a new VM is added to the system, an existing VM is removed from the system or every time the MAC address changes. Furthermore, by using the VM inventory objects, the DHCP manager updates the DHCP bindings dynamically anytime there are any changes in the MAC addresses.

System Overview and Examples of Operation

Figure 1:
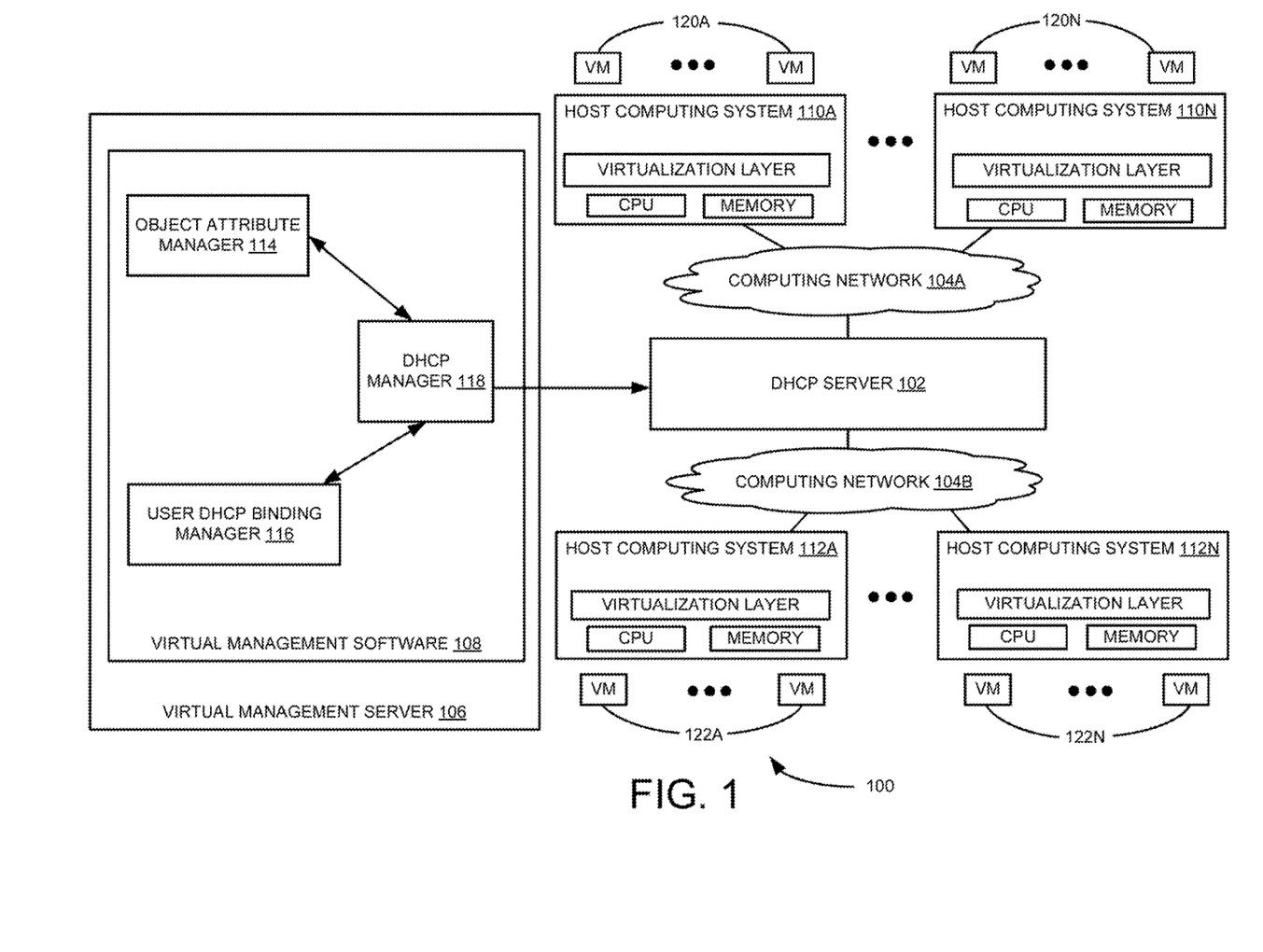
FIG. 1 is a block diagram that illustrates using dynamically collaborated and managed network services for dynamically configuring a dynamic host configuration protocol (DHCP) server in a virtual network environment, according to an example embodiment.

FIG. 1 is a block diagram that illustrates using dynamically collaborated and managed network services for dynamically configuring a DHCP server in virtual network environment 100, according to an example embodiment. In the example shown in FIG. 1, virtual network environment 100 includes plurality of host computing systems 110A-N and plurality of VMs 120A-N, respectively, hosted by host computing systems 110A-N. Further, virtual network environment 100 includes plurality of host computing systems 112A-N and plurality of VMs 122A-N, respectively, hosted by host computing systems 112A-N. Also as shown in FIG. 1, virtual network environment 100 includes computing networks 104A and 104B and DHCP server 102. Further as shown in FIG. 1, host computing systems 110A-N are communicatively coupled to DHCP server 102 via computing network 104A. Similarly as shown in FIG. 1, host computing systems 112A-N are communicatively coupled to DHCP server 102 via computing network 104B.

Also as shown in FIG. 1, virtual network environment 100 includes virtual management server 106. Further as shown in FIG. 1, virtual management server 106 includes virtual management software 108 to provide any needed automated operations management and proactive performance management and to gain visibility across the physical and virtual infrastructures. Furthermore as shown in FIG. 1, virtual management software 108 includes object attribute manager 114, user DHCP binding manager 116, and DHCP manager 118. In addition as shown in FIG. 1, DHCP manager 118 is communicatively coupled to DHCP server 102. One skilled in the art can envision that virtual management software 108 can include one or more DHCP managers, one for each of host computing systems on a computing network, that are communicatively coupled to DHCP server 102.

Figure 2:
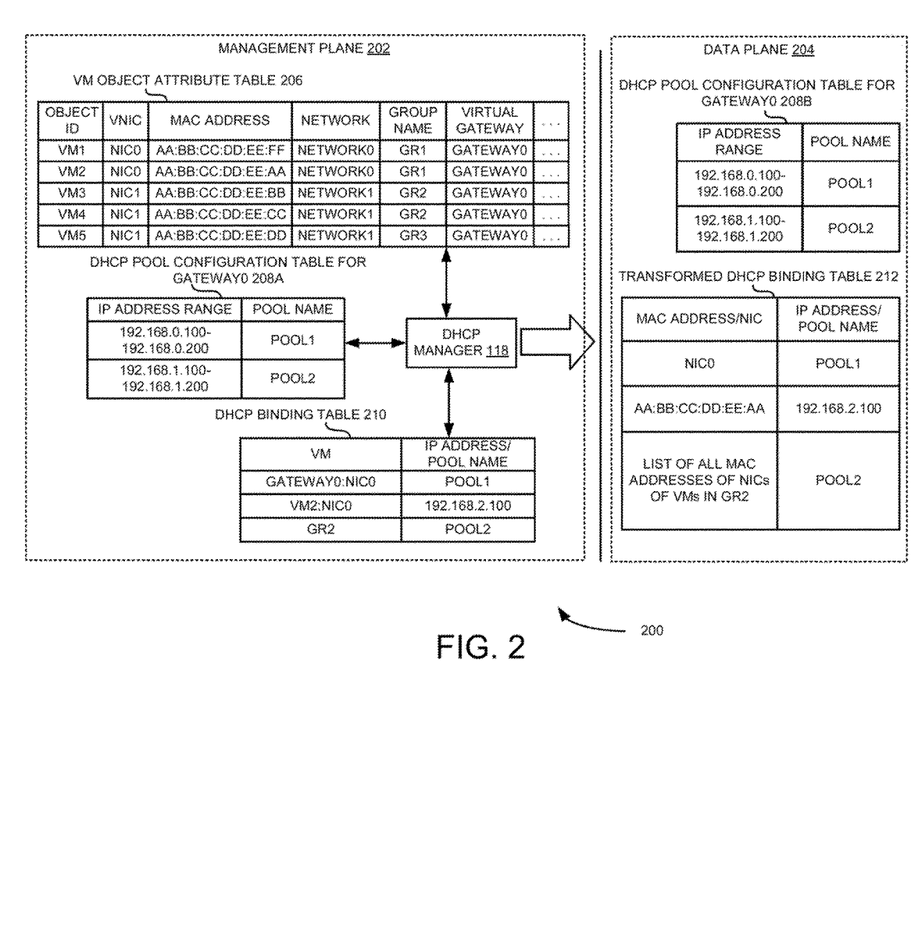
FIG. 2 is a block diagram of a communication system that includes multiple components associated with the dynamically collaborated and managed network services and a dynamically configurable DHCP server to impose DHCP bindings based on interaction with different components of the communication system, according to an example embodiment.

In operation, DHCP manager 118 configures DHCP bindings using VM inventory objects from VM object attribute table 206 (shown in FIG. 2) via object attribute manager 114. In one embodiment, the DHCP bindings can include DHCP static bindings and/or DHCP dynamic bindings. For example, VM object attribute table 206 is a table used for storing information associated with the VM inventory objects. In this example, the VM inventory objects are a collection of virtual objects, such as VMs, virtual network interface cards (vNICs), virtual gateways and the like. In one example, DHCP manager 118 configures the DHCP bindings using the VMs, the vNICs, groups of VMs, and/or the virtual gateways from VM object attribute table 206 via object attribute manager 114. In this example, the groups of VMs are formed statically or dynamically by grouping two or more of the VMs based on common attributes, such as a group name, a network name/identifier, a datacenter name, an operating system, inventory folders, resource pools, VM tags, memory/processors, and so on. For example, table 210 in FIG. 2 illustrates the configured DHCP bindings for gateway0. In other words, table 210 is a user configured DHCP binding table where a user defines which VM or group of VMs gets IP addresses from which pool of IP addresses. In this example, DHCP manager 118 configures IP addresses/pool names in table 210 using DHCP pool configuration table for gateway0 208A in management plane 202. In this example, DHCP pool configuration table for gateway0 208A is a table used for storing ranges of IP addresses and associated pool names. DHCP manager 118 may configure the IP addresses/pool names in table 210 from the stored ranges of IP addresses and associated pool names in DHCP pool configuration table for gateway0 208A. In some embodiments, DHCP pool configuration table for gateway0 208A also includes information about assigned IP addresses and free IP addresses.

DHCP manager 118 then transforms the configured DHCP bindings by replacing the VM inventory objects in the configured DHCP bindings with associated MAC addresses using VM object attribute table 206 via object attribute manager 114. DHCP manager 118 then sends the transformed DHCP bindings in table 212 to DHCP server 102 for assigning IP addresses to VMs 120A-N and/or VMs 122A-N running on host computing systems 110A-N and host computing systems 112A-N, respectively. In these embodiments, DHCP server 102 is configured for assigning IP addresses to VMs residing on the same or different host computing systems. For example, table 212 includes actual system configured DHCP bindings using which DHCP server 102 assigns IP addresses to VMs 120A-N and/or VMs 122A-N running on host computing systems 110A-N and host computing systems 112A-N, respectively. In some embodiments, data plane 204 include DHCP pool configuration table for gateway0 208B. In these embodiments, DHCP pool configuration table for gateway0 208B is a table used for storing ranges of IP addresses and associated pool names. In the example shown in FIG. 2, using the transformed DHCP bindings in table 212, DHCP server 102 assigns IP addresses to VMs sending requests to NIC0 of gateway0 from pool1 in DHCP pool configuration table for gateway0 208B based on the associated MAC addresses, assigns an IP address to VM2 based on the associated MAC address and assigns IP addresses to VMs in group2 (GR2) from pool2 in DHCP pool configuration table for gateway0 208B based on the associated MAC addresses. In the example shown in FIG. 2, even though VM5 and VMs in GR2 are in network1, DHCP server 102 assigns IP addresses to VMs in GR2 from pool1 and does not assign an IP address to VM5 from pool1 because VM5 is in a different group (i.e., GR3). For example, VM1, VM2, VM3, VM4, and VM5 shown in FIG. 2, are object identities (IDs) of any of VMs 120A-N and VMs 122A-N and network0 and network1, shown in FIG. 2, can be computing network 104A and computing network 104B, respectively.

DHCP manager 118 then determines whether there are any updates made to the configured DHCP bindings in table 210 and/or the VM inventory objects in VM object attribute table 206. For example, the update may include addition of a VM, deletion of a VM, change in a network property of a vNIC, addition/deletion of a vNIC to a VM, change of VM's MAC address, addition/change of attributes of a VM, change in configured DHCP bindings, change in group membership of a VM and the like. In this example, the change in configured DHCP bindings is addition of a DHCP binding, deletion of a DHCP binding and/or update of a DHCP binding in which VM inventory object referenced changes.

In these embodiments, DHCP manager 118 can determine the updates for other tables or the other sub components. Further, VMs 120A-N and VMs 122A-N or host computing systems 110A-N and host computing systems 112A-N running VMs 120A-N and VMs 122A-N, respectively, may proactively send an update to DHCP manager 118 when there is any change in their respective configurations. In some embodiments, the updates can be proactively generated by VM object attribute table 206 or by continuously polling and looking for any changes in VM object attribute table 206. If there are any updates made to the configured DHCP bindings and/or the VM inventory objects, DHCP manager 118 dynamically updates the transformed DHCP bindings sent to DHCP server 102 by repeating the steps of configuring, transforming and sending to DHCP server 102. If there are no updates made to the configured DHCP bindings and/or the VM inventory objects, DHCP manager 118 continues the step of determining whether there are any updates made to the configured DHCP bindings and/or the VM inventory objects. In these embodiments, object attribute manager 114 and user DHCP binding manager 116 dynamically maintain updates to VM object attribute table 206 and the configured DHCP bindings in table 210, respectively.

Similarly, DHCP server 102 can be dynamically configured using physical objects, such as host computing systems or physical machines for assigning IP addresses to host computing systems and physical machines, respectively, in a physical network environment.

Also, although certain terms are used primarily herein, other terms could be used interchangeably to yield equivalent embodiments and examples. For example, the term "changes" may be used interchangeably with "updates", "revisions" or the like. Further for example, it is well-known that equivalent terms in the field of system virtualization or similar or related fields could be substituted for such terms as "physical computer," "hypervisor," "virtual machine," or the like.

Numerous specific details are set forth herein, such as data formats and code sequences, and the like, in order to provide a thorough understanding of the described techniques. The embodiments described also can be practiced without some of the specific details described herein, or with other specific details, such as changes with respect to the ordering of the logic, different logic, different architectures, or the like. Thus, the scope of the techniques and/or functions described are not limited by the particular order, selection, or decomposition of aspects described with reference to any particular routine, module, component, or the like.

Example Processes

Figure 3:
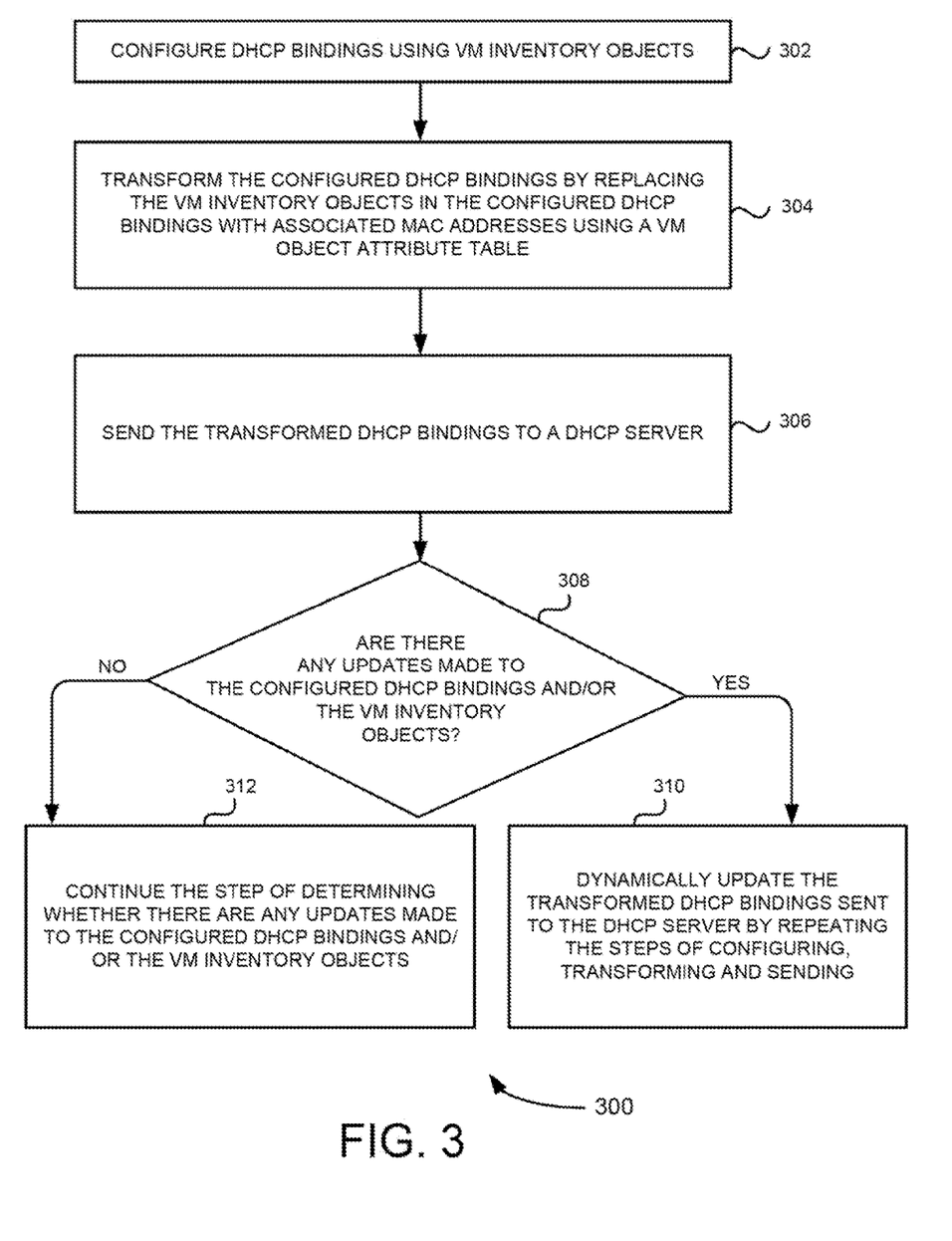
FIG. 3 is a flow diagram of a process for dynamically configuring a DHCP server in a virtual network environment, according to an example embodiment.

FIG. 3 is a flow diagram 300 of a process for dynamically configuring a DHCP server in a virtual network environment, according to an example embodiment. At block 302, DHCP bindings are configured using VM inventory objects. For example, the VM inventory objects include virtual objects, such as VMs, vNICs, and/or virtual gateways. In one embodiment, the DHCP bindings are configured using the VMs, groups of VMs, the vNICs, and/or the virtual gateways. At block 304, the configured DHCP bindings are transformed by replacing the VM inventory objects in the configured DHCP bindings with associated MAC addresses using a VM object attribute table. At block 306, the transformed DHCP bindings are sent to the DHCP sever for assigning IP addresses to multiple VMs running on a plurality of host computing systems in a computing network.

At block 308, it is determined whether there are any updates made to the configured DHCP bindings and/or the VM object attribute table. For example, the update includes addition of a VM, deletion of a VM, change in a network property of a vNIC, addition/deletion of a vNIC to a VM, change of VM's MAC address, addition/change of attributes of a VM, change in group membership of a VM and/or change in configured DHCP bindings. In this example, the change in configured DHCP bindings is addition of a DHCP binding, deletion of a DHCP binding and/or update of a DHCP binding in which VM inventory object referenced changes.

At block 310, the transformed DHCP bindings sent to the DHCP server are dynamically updated by repeating the steps of configuring, transforming and sending, if there are any updates made to the configured DHCP bindings and/or the VM object attribute table. At block 312, the step of determining whether there are any updates made to the configured DHCP bindings and/or the VM object attribute table is continued, if there are no updates made to the configured DHCP bindings and/or the VM object attribute table. Further in these embodiments, updates to the VM inventory objects and/or the configured DHCP bindings are dynamically maintained.

Example Computing System Implementation

Figure 4:
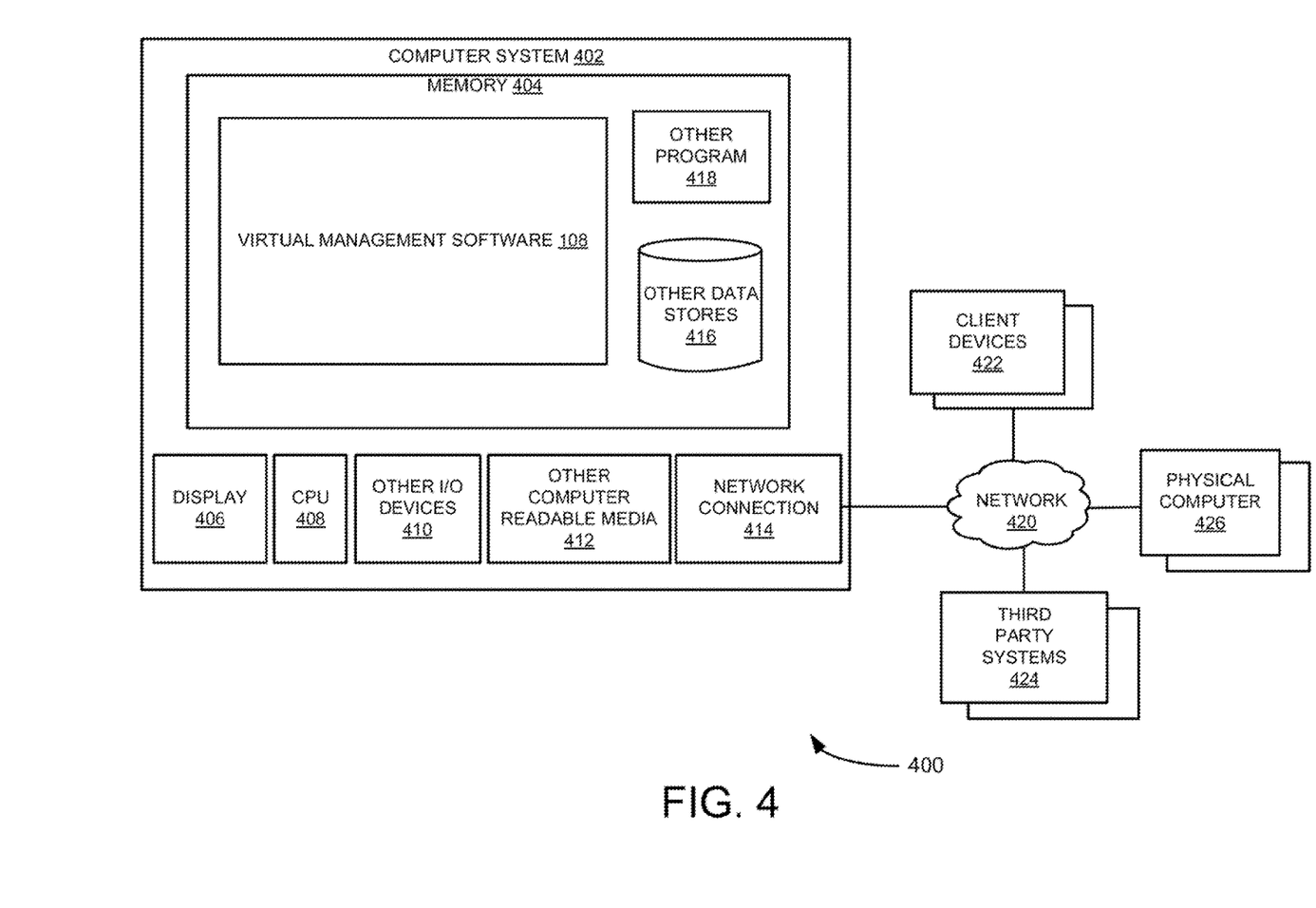
FIG. 4 is a block diagram of an example computing system for dynamically configuring the DHCP server, such as the one shown in FIG. 1, according to an example embodiment.

FIG. 4 is a block diagram 400 of an example computing system for dynamically configuring a DHCP server, such as the one shown in FIG. 1, according to an example embodiment. In particular, FIG. 4 shows computing system 402 that may be utilized to implement virtual management software 108, such as shown in FIG. 1.

Note that one or more general purpose virtual or physical computer systems suitably instructed may be used to implement virtual management software 108 including DHCP manager 118 (shown in FIGS. 1 and 2). In addition, computing system 402 may comprise one or more distinct computing systems/devices and may span distributed locations. Furthermore, each block shown may represent one or more such blocks as appropriate to a specific embodiment or may be combined with other blocks. Also, virtual management software 108 including DHCP manager 118 may be implemented in software, hardware, firmware, or in some combination to achieve the capabilities described herein.

In the embodiment shown, computing system 402 may comprise computer memory ("memory") 404, display 406, one or more central processing units ("CPUs") 408, Input/output (I/O) devices 410 (e.g., keyboard, mouse, etc.), other computer-readable media 412, and network connections 414. Virtual management software 108 is shown residing in memory 404. The components of virtual management software 108 may execute on one or more CPUs 408 and implement techniques described herein. Other code or programs 418 (e.g., an administrative interface, a Web server, and the like) and potentially other data repositories, such as data store 416, may also reside in memory 404, and execute on one or more CPUs 408. One or more of the components in FIG. 4 may not be present in any specific implementation. For example, some embodiments may not provide other computer readable media 412 or display 406.

Virtual management software 108 interacts via network 420 with client devices 422, physical computers 426, and/or third-party systems/applications 424. Network 420 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication to and from remotely situated humans and/or devices.

As discussed above with reference to FIGS. 1 and 2, virtual management software 108 including DHCP manager 118 dynamically configures DHCP bindings in the virtual network environment. The architecture shown in FIG. 4 may in some embodiments be partially or fully virtualized. For example, computer system 402 may be one or possibly many VMs executing on physical hardware and managed by a hypervisor, virtual machine monitor, or similar technology. Also, physical computers 426 may include virtualization logic to manage multiple VMs.

In an example embodiment, components/modules of virtual management software 108 are implemented using standard programming techniques. For example, virtual management software 108 may be implemented as a "native" executable running on CPU 408, along with one or more static or dynamic libraries. In other embodiments, virtual management software 108 may be implemented as instructions processed by a VM that executes as one of other programs 418.

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

Furthermore, in some embodiments, some or all of the components of virtual management software 108 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a non-transitory computer-readable storage medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Further, from the foregoing it will be appreciated that, although specific embodiments have been described herein for purposes of illustration, various modifications may be made without deviating from the spirit and scope of this disclosure. For example, the methods, techniques, and systems for dynamic configuration of a DHCP server in a virtual network environment Also, the methods, techniques, and systems discussed herein are applicable to differing protocols, communication media (optical, wireless, cable, etc.) and devices (e.g., desktop computers, wireless handsets, electronic organizers, personal digital assistants, tablet computers, portable email machines, game machines, pagers, navigation devices, etc.).

The invention claimed is:

1. A method for dynamically configuring a dynamic host configuration protocol (DHCP) server in a virtual network environment, the method comprising:
   generating a virtual machine (VM) object attribute table by mapping VM inventory objects to associated media access control (MAC) addresses of multiple VMs running on a plurality of host computing systems in a computing network;
   configuring DHCP bindings using VM inventory objects from the VM object attribute table, wherein configuring the DHCP bindings using the VM inventory objects, comprises:
      configuring the DHCP bindings using VMs, groups of VMs, virtual network interface cards (vNICs), virtual gateways, or a combination thereof;
   transforming the configured DHCP bindings by replacing the VM inventory objects in the configured DHCP bindings with associated MAC addresses using the VM object attribute table;
   sending the transformed DHCP bindings to the DHCP server for assigning Internet protocol (IP) addresses to the multiple VMs running on the plurality of host computing systems in the computing network; and
   dynamically updating the transformed DHCP bindings sent to the DHCP server based on updates made to the VM object attribute table or the configured DHCP bindings.

2. The method of claim 1, wherein dynamically updating the transformed DHCP bindings comprises:
   determining whether there are any updates made to the configured DHCP bindings and/or the VM object attribute table;
   if it is determined there are updates, then dynamically updating the transformed DHCP bindings sent to the DHCP server by repeating the steps of configuring, transforming and sending; and
   if it is determined there are no updates, then continuing the step of determining whether there are any updates made to the configured DHCP bindings and/or the VM object attribute table.

3. The method of claim 2, further comprising:
   dynamically maintaining updates to the VM object attribute table and/or the configured DHCP bindings.

4. The method of claim 2, wherein the update comprises addition of a VM, deletion of a VM, change in a network property of a vNIC, addition/deletion of a vNIC to a VM, change of VM's MAC address, addition/change of attributes of a VM, change in group membership of a VM and/or change in configured DHCP bindings and wherein the change in configured DHCP bindings is addition of a DHCP binding, deletion of a DHCP binding and/or update of a DHCP binding in which VM inventory object referenced changes.

5. A system, comprising:
   a plurality of host computing systems hosting multiple virtual machines (VMs) in a computing network;
   a dynamic host configuration protocol (DHCP) server coupled to the plurality of host computing systems; and
   a virtual management server, comprising:
      a DHCP manager to dynamically configure the DHCP server in a virtual network environment, by:
         generating a VM object attribute table by mapping VM inventory objects to associated media access control (MAC) addresses of the multiple VMs:
         configuring DHCP bindings using VM inventory objects, wherein configuring the DHCP bindings using the VM inventory objects from the VM object attribute table, comprises:
            configuring the DHCP bindings using VMs, groups of VMs, virtual network interface cards (vNICs), virtual gateways, or a combination thereof;
         transforming the configured DHCP bindings by replacing the VM inventory objects in the configured DHCP bindings with associated MAC addresses using a VM object attribute table;

sending the transformed DHCP bindings to the DHCP server for assigning Internet protocol (IP) addresses to the multiple VMs running on the plurality of host computing systems in the computing network; and dynamically updating the transformed DHCP bindings sent to the DHCP server based on updates made to the VM object attribute table or the configured DHCP bindings.

6. The system of claim 5, wherein the DHCP manager is further configured to:

determine whether there are any updates made to the configured DHCP bindings and/or the VM object attribute table;

if it is determined there are updates, then dynamically update the transformed DHCP bindings sent to the DHCP server by repeating the steps of configuring, transforming and sending; and if it is determined there are no updates, then continue the step of determining whether there are any updates made to the configured DHCP bindings and/or the VM object attribute table.

7. The system of claim 6, wherein the DHCP manager is further configured to:

dynamically maintain updates to the VM object attribute table and/or the configured DHCP bindings.

8. The system of claim 6, wherein the update comprises addition of a VM, deletion of a VM, change in a network property of a vNIC, addition/deletion of a vNIC to a VM, change of VM's MAC address, addition/change of attributes of a VM, change in group membership of a VM and/or change in configured DHCP bindings and wherein the change in configured DHCP bindings is addition of a DHCP binding, deletion of a DHCP binding and/or update of a DHCP binding in which VM inventory object referenced changes.

9. A non-transitory computer-readable storage medium including instructions that are configured, when executed by a computing device, to perform a method for dynamically configuring a dynamic host configuration protocol (DHCP) server in a virtual network environment, the method comprising:

generating a virtual machine (VM) object attribute table by mapping VM inventory objects to associated media access control (MAC) addresses of multiple VMs running on a plurality of host computing systems in a computing network;

configuring DHCP bindings using VM inventory objects from the VM object attribute table, wherein configuring the DHCP bindings using the VM inventory objects, comprises:

configuring the DHCP bindings using VMs, groups of VMs, virtual network interface cards (vNICs), virtual gateways, or a combination thereof;

transforming the configured DHCP bindings by replacing the VM inventory objects in the configured DHCP bindings with associated MAC addresses using the VM object attribute table; and sending the transformed DHCP bindings to the DHCP server for assigning Internet protocol (IP) addresses to be multiple VMs running on the plurality of host computing systems; and dynamically updating the transformed DHCP bindings sent to the DHCP server based on updates made to the VM object attribute table or the configured DHCP bindings.

10. The non-transitory computer-readable storage medium of claim 9, wherein dynamically updating the transformed DHCP bindings comprises:

determining whether there are any updates made to the configured DHCP bindings and/or the VM object attribute table;

if it is determined there are updates, then dynamically updating the transformed DHCP bindings sent to the DHCP server by repeating the steps of configuring, transforming and sending; and if it is determined there are no updates, then continuing the step of determining whether there are any updates made to the configured DHCP bindings and/or the VM object attribute table.

11. The non-transitory computer-readable storage medium of claim 10, further comprising:

dynamically maintaining updates to the VM object attribute table and/or the configured DHCP bindings.

12. The non-transitory computer-readable storage medium of claim 10, wherein the update comprises addition of a VM, deletion of a VM, change in a network property of a vNIC, addition/deletion of a vNIC to a VM, change of VM's MAC address, addition/change of attributes of a VM, change in group membership of a VM and/or change in configured DHCP bindings and wherein the change in configured DHCP bindings is addition of a DHCP binding, deletion of a DHCP binding and/or update of a DHCP binding in which VM inventory object referenced changes.

* * * * *